United States Patent [19]

Chevrel et al.

[11] Patent Number: 5,396,039
[45] Date of Patent: Mar. 7, 1995

[54] PROCESS FOR ASSEMBLING PIPING OR COMPONENTS BY TIG WELDING

[75] Inventors: Henri Chevrel; Taeko Hattori; Hideki Takagi, all of Tsukuba; Eiichi Ozawa, Chiba; Jean-Marie Friedt, Tokyo, all of Japan

[73] Assignee: L'Air Liquide, Societe Anonyme pour l'Etude et l'Exploitation des Procedes Georges Claude, Paris Cedex, France

[21] Appl. No.: 156,817

[22] Filed: Nov. 24, 1993

[51] Int. Cl.[6] .............................................. B23K 9/00
[52] U.S. Cl. ...................................... 219/61; 219/74; 219/137 R
[58] Field of Search ................ 219/60 A, 61, 137 R, 219/74

[56] References Cited

U.S. PATENT DOCUMENTS

| | | | |
|---|---|---|---|
| 2,856,509 | 10/1958 | Stanchus | 219/74 |
| 2,918,563 | 12/1959 | Ternisien et al. | 219/74 |
| 3,536,879 | 10/1970 | Hartsell, Jr. et al. | 219/60 A |

*Primary Examiner*—Clifford C. Shaw
*Attorney, Agent, or Firm*—Oblon, Spivak, McClelland, Maier & Neustadt

[57] ABSTRACT

A process to avoid or limit corrosion at the junction of two piping comprising devices welded together, said piping comprising devices being adapted to flow corrosive gases through them, said process comprising the steps of:
  a) providing a first piping comprising device and connecting it to an inert gas source;
  b) purging it with an inert gas comprising substantially not more than 10 ppb of an oxidizing gas selected from the group consisting of oxygen, carbon dioxide, water vapor or mixtures thereof, said inert gas flowing from a first opening to a second opening of said piping comprising device;
  c) providing a second pipe comprising device in flow communication with the first one, while continuing to purge the first piping comprising device;
  d) welding the two piping comprising devices, said welding being carried out under an inert gas atmosphere; and
  e) repeating steps c and d if necessary.

10 Claims, 5 Drawing Sheets

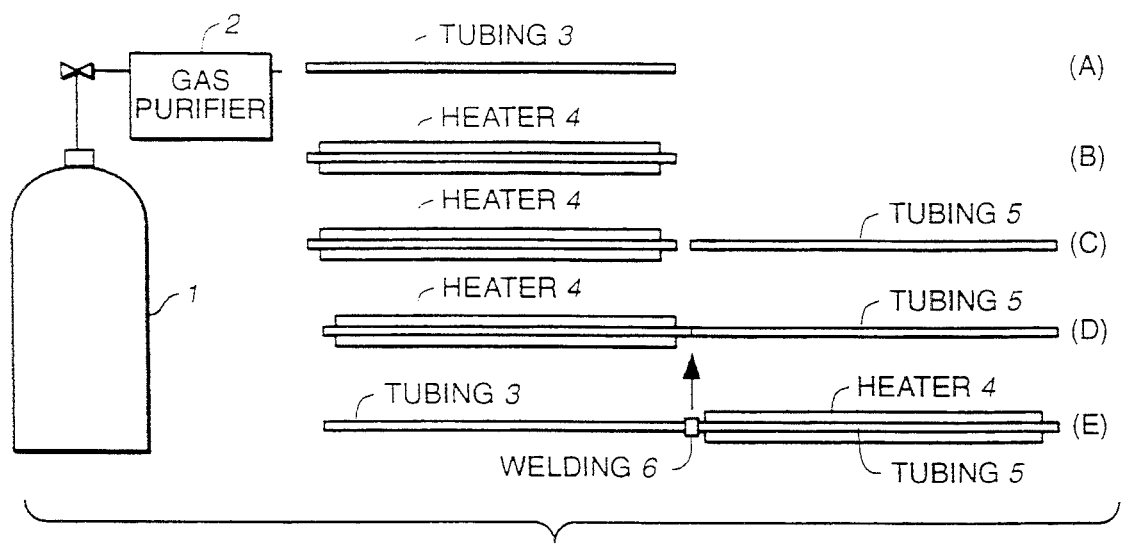
FIG._1A
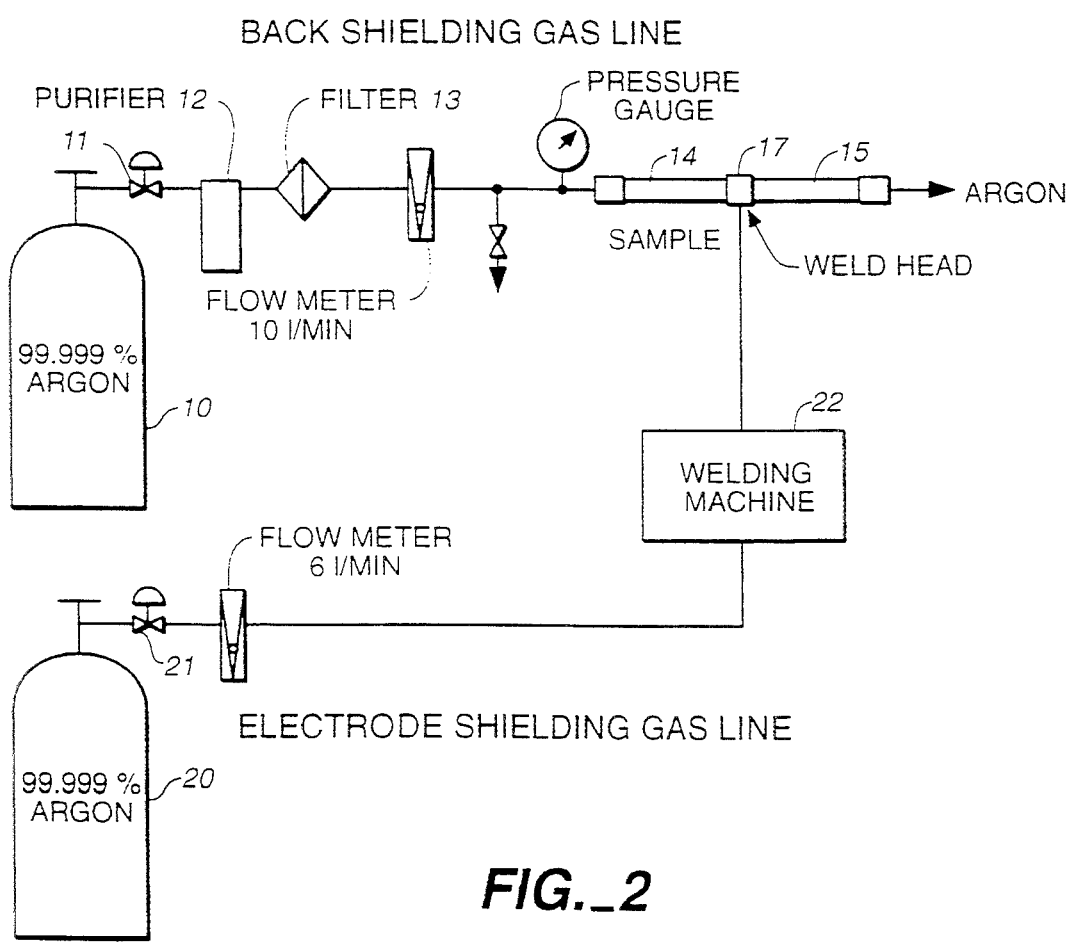
FIG._2

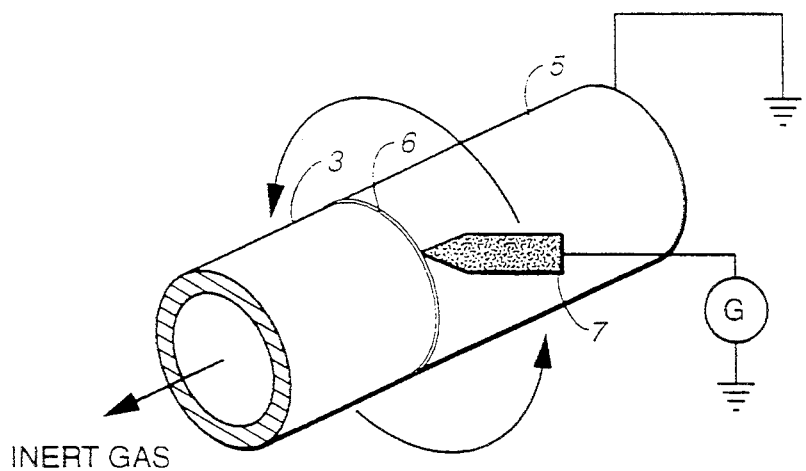
FIG._1B-1
FIG._1B-2
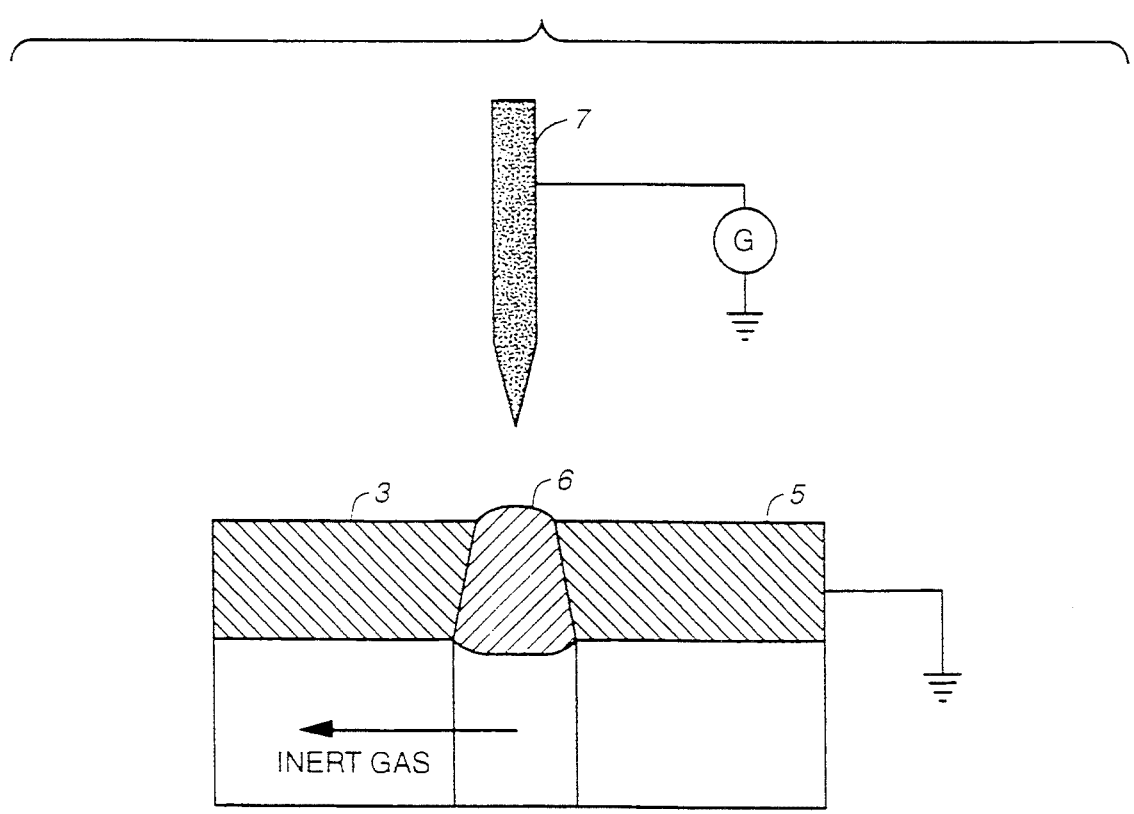

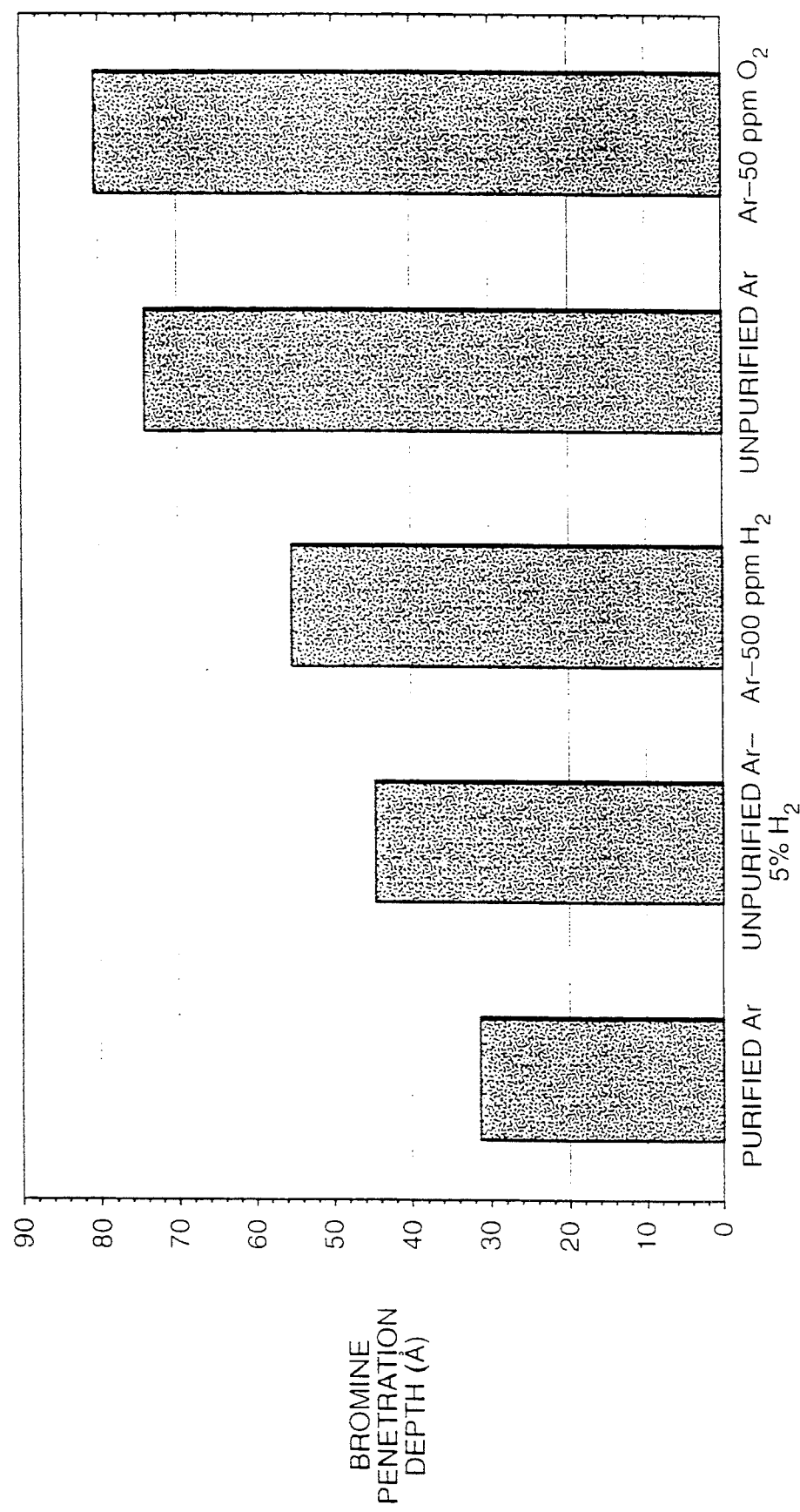
FIG._3

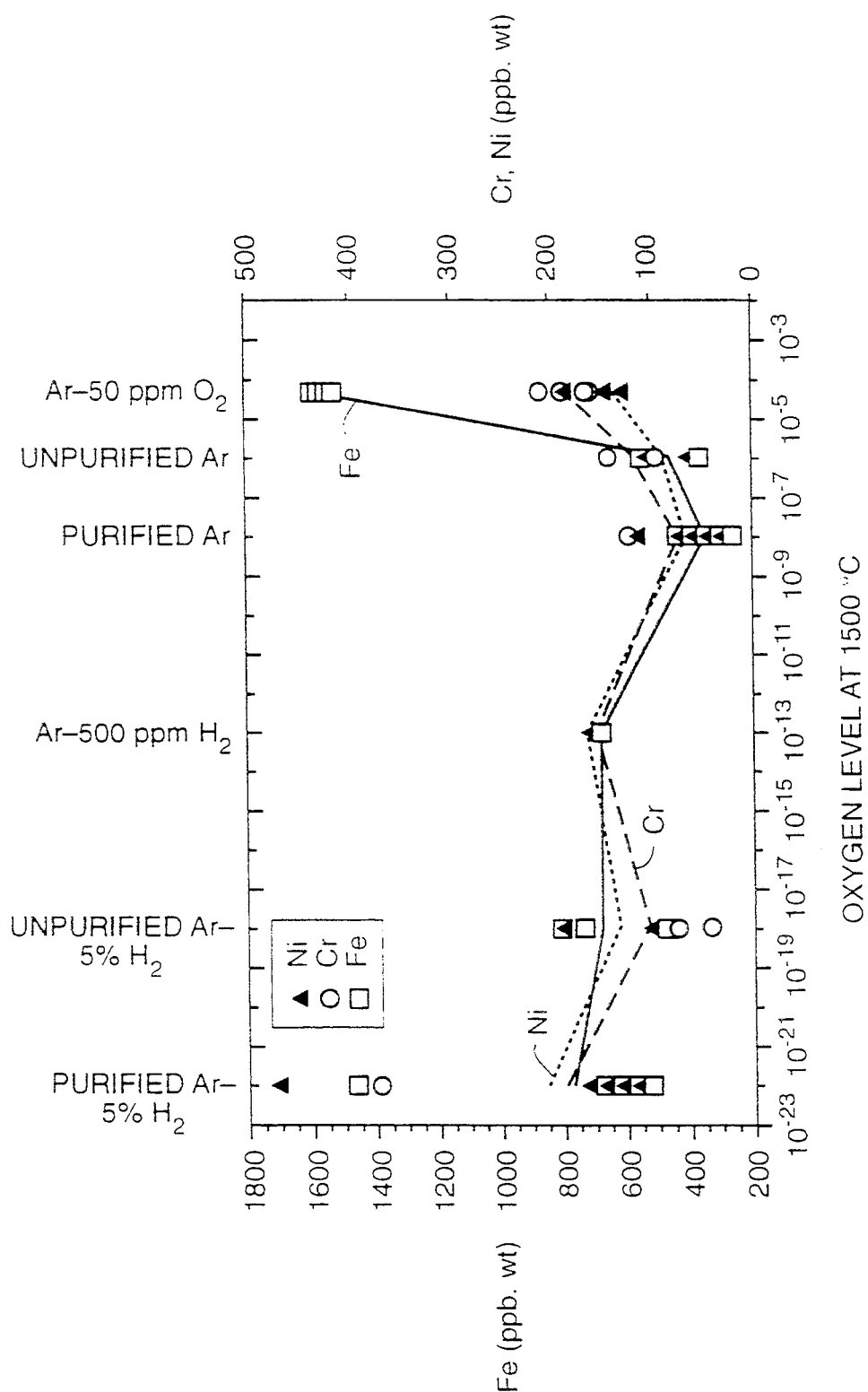
FIG._4

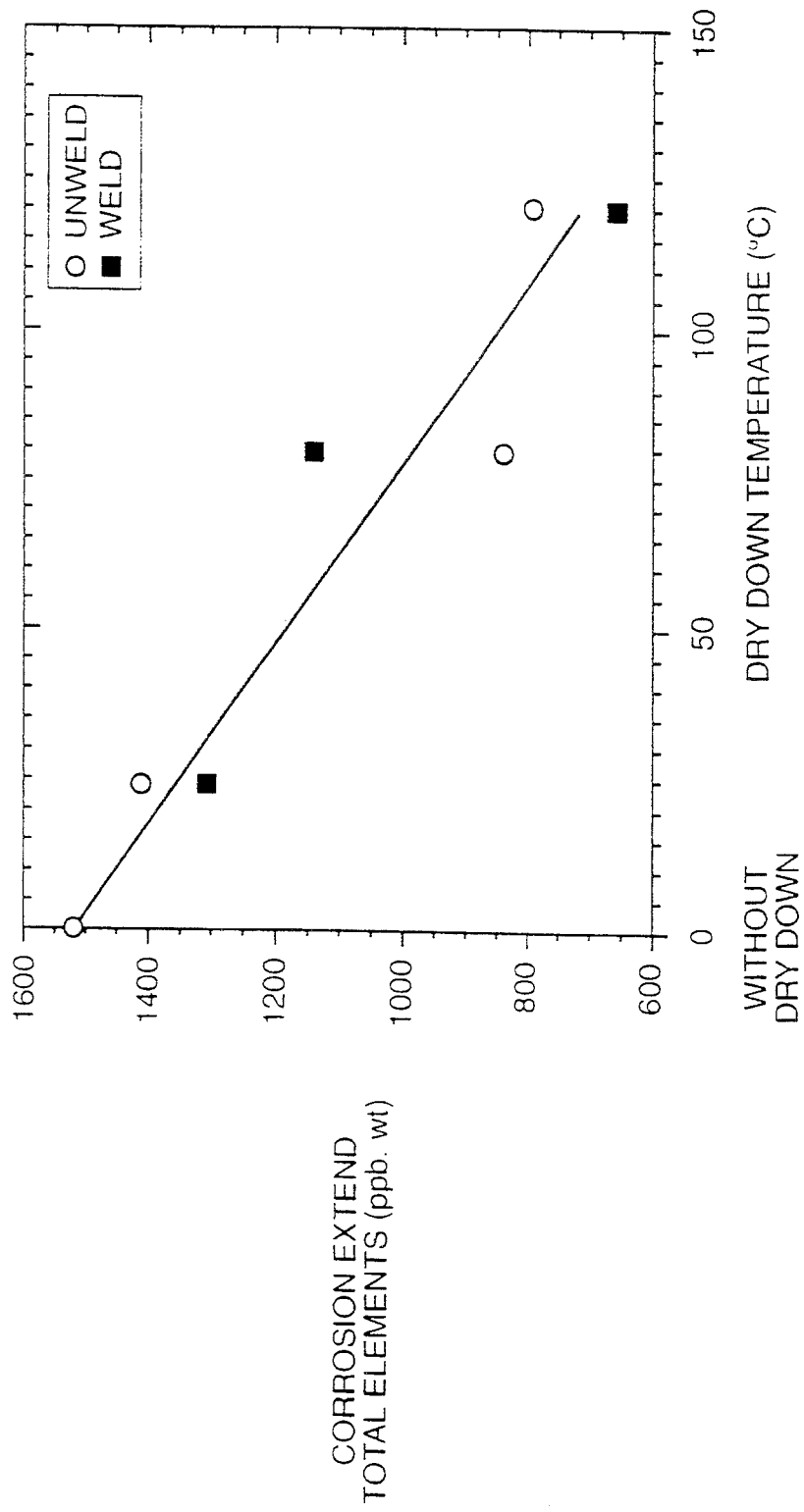
FIG._5

PROCESS FOR ASSEMBLING PIPING OR COMPONENTS BY TIG WELDING

TECHNICAL FIELD OF THE INVENTION

This invention relates to a process for assembling piping and/or components by welding such as Tungsten inert Gas (T.I.G.) welding or laser welding, in order to provide a corrosion-free distribution of ultra-high purity corrosive gases which are used, for example, in the manufacture of electronic components or in other industries.

BACKGROUND OF THE INVENTION

In the manufacture of electronic components such as integrated circuits, corrosive gases are used (pure or mixtures) to carry out various operations, particularly the various etching steps. These gases need to be very pure, i.e., their particulate and gaseous contaminants should be as low as possible. These gases are usually flowing from a cylinder located remotely from the point of use through a piping network installed throughout the plant from said gas cabinet to the point of use. To make this piping system, it is necessary to use several individual pipings and various components such as valves, fittings, filters, pressure regulators or the like which are usually welded together. It is known that 316L stainless steel electropolished tubings are corrosion resistant; however welding of these tubings together or with other various components induce localized areas sensitive to corrosion. These areas are of concern regarding both safety and micro contamination aspects. Particularly, it is believed that those localized areas sensitive to corrosion might be a source of micro contamination of the gases flowing through these tubings. A distribution system of gases for semiconductor manufacture is disclosed in the article entitled "HCl Gas Distribution System: The Effect of Surface Finish and Point of Use Purification", R. Diguid et al., July 1993, Solid State Technology, pp. 79–85. Also, the Orbital Tungsten Inert Gas welding process is disclosed in the article entitled "Orbital TIG Welding of Electropolished High Alloy Steel Tubes", by Herbert Geil; Stainless Steel Europe, May 1992.

Corrosion resistance of a stainless steel surface is known (from H. H. Uhlig & R. W. Review, "Corrosion and Corrosion Control" by John Wiley & sons, 3rd Edition, 1985) to be related to the surface enrichment in chromium oxide while on the contrary the presence of superficial iron oxide would have a detrimental effect on corrosion resistance.

The welding bead area is known to be the corrosion sensitive point of a welded assembly of stainless steel parts. The experiments conducted by the inventors indicate that the corrosion occurs mainly in a zone distance between about 2 mm and 10 mm from the bead in the case of electropolished stainless steel tubing of 1 mm thickness. The length of the above zone depends on the energy input from the welding, and the corrosion sensitization of this zone is attributed to modifications of the surface near the welding bead during the welding.

The oxidation reduction properties are controlled by the thermodynamic equilibrium between the metal surface and the gas atmosphere as explained in the Ellingham diagram disclosed in B. J. Reed, "Free Energy of Formation of Binary Compounds", Eds. (1985).

The inventors thus believe that the modification of the surface is related to the oxygen partial pressure of the back shielding gas both directly by chemical surface reaction and indirectly via elemental diffusion phenomena between the base alloy and the modified surface.

The level of oxidetire impurities in the common industrial grade argon creates in the zone of the device heated by the welding a layer composed of a mixture of iron oxide and chromium oxide near and on the welding bead. It is therefore very important to control the level of oxygen containing chemicals such as moisture, oxygen, or carbon dioxide, in the welding back shield gas.

In the Tungsten Inert Gas welding (TIG) process, the gases used as back shielding gases obtainable from the gas supplier ere usually pure argon having a purity which is at least equal to 99.999% (the impurities content is below 10 ppm).

In addition, in the case of tube welding, the source of impurities arises from the gas itself as well as by desorption from the wall of the tube upstream. These impurities are as defined hereabove, essentially oxygen-containing compounds such as $H_2O$, $O_2$, $CO_2$ or the like.

The usual technique is to decrease the oxygen partial pressure at the welding bead at the time of the welding. To do so, it is known to add hydrogen, but this has some drawbacks, especially when it comes to the safety point of view. (In the microelectronics industry, hydrogen detectors are present in the clean rooms where the welding work is performed). Furthermore, hydrogen can be dissolved in the alloy, which is detrimental to its mechanical and outgassing properties.

It is also known from M. Morin, S. Miyoshi, K. Kawada, and T. Ohmi, "Ultra Clean Welding for High Grade Gas Handling Technology", in Electro Chemical Society, Meeting, Hi. (1993), that manganese particles formed during the welding and deposited downstream (the maximum deposition occurs at about 5 mm from the welding bead) are detrimental to corrosion resistance.

It is also known that corrosion by gases such as HCl or HBr is accelerated in the presence of impurities, particularly $H_2O$. Even with high purity HCl or HBr, the metallic surface state will strongly affect the corrosion, particularly when $H_2O$ is adsorbed at the metal surface prior to corrosive gas exposure of high or low purity.

When making a piping system, e.g., for a semi-conductor plant, between the gas cabinet and the point of use, tubes are usually welded together, then the entire line of piping is purged in order to clean it essentially by removing moisture before using it. However, there is still a problem regarding the use of corrosive gases with which even such a procedure is not very efficient, and the corresponding piping system has to be changed frequently.

SUMMARY OF THE INVENTION

The problem at the basis of the present invention is the existence of water adsorbed on the walls of tubings or similar devices used to flow corrosive gases, because the interaction between these corrosive gases and these tubings or the like is a function of the quantity of water adsorbed. In order to make a welding with a high purity back shielding gas, it is necessary to remove any water impurity (even trace amounts if possible) before making such welding. The solution of the problem, according to the present invention, is to continue to keep the walls of the tubings moisture-free, even after the welding, in order to eliminate or at least substantially reduce further corrosion of said tubings after the injection of said corrosive gases. An inert gas having the low moisture content is thus used for the purge of the tubing and as a back shield gas for welding. Preferably, the purge gas is nitrogen (having a very low moisture content) and the welding (back shield) gas is argon (having a similar very low moisture content) or a mixture of both.

The present invention relates to a process to avoid or limit corrosion at the junction of two piping comprising devices welded together, said piping comprising devices being adapted to flow corrosive gases therethrough, said process comprising the steps of:
 a) providing a first piping comprising device and connecting it to an inert gas source;
 b) purging it with an inert gas comprising substantially not more than 10 ppb of an oxidizing species, such as a species selected from the group comprising oxygen and water vapor, said inert gas flowing from a first opening to a second opening of said piping comprising device;
 c) placing a second piping comprising device in flow communication with the first one, while continuing to purge the first piping comprising device;
 d) welding sealingly the two piping comprising devices, said welding being carried out under an inert gas atmosphere; and
 e) repeating steps c and d if necessary.

According to a preferred embodiment, the process comprises between steps c and d, a step of purging said second piping comprising device with the inert gas flowing from said second opening of said piping comprising device. Preferably, at least one of the pipings is heated after starting purging at least one of the said pipings.

Preferably, the process according to the invention comprises at least one of the following steps:
 Purge of the piping comprising devices with purified argon or nitrogen until the impurity level of the gas after the purge is below 10 ppb $O_2$ or $H_2O$ (preferably below 10 ppb $O_2$ and/or $H_2O$ and/or $CO$ and/or $CO_2$ and/or $CH_4$) for dry down of inner tubing surface. Heating of the tubing between 80° C. and 450° C., preferably between 100° C. and 150° C., may be used to assist the dry down (heating the overall tube).
 Orbital welding using purified argon as back shielding gas, said argon containing no more than 10 ppb $O_2$, $H_2O$, $CO$, $CO_2$, or $CH_4$.
 Flowing the corrosive gas without exposing the tubing to ambient air or repeat the above purge operation before introduction of a corrosive gas.

The use of pure (or purified) argon also provides an additional advantage which is the reduction of the thickness of the manganese oxide layer at about 5 mm downstream of the welding bead.

DESCRIPTION OF THE DRAWINGS

FIG. 1-A represents schematically the various steps of the preferred process according to the invention. An inert gas such as argon is provided by a source of inert gas 1 through a purifier 2 in order to obtain an inert gas substantially moisture-free as explained hereabove. The gas flows through the tubing 3 to purge it. Then heating means 4 (b), such as a heating shell, is positioned around the tubing 3 in order to heat said tubing, desorb moisture on the internal wall of said tubing 3, which moisture is carried by the flow of gas to the exit of said tubing 3. Then another tubing 5 (step (c)) is placed in flow relationship with 3 (such as abutting the two ends of those tubings). The tubing 5 is then purged (as 3 was), the two tubings are welded together, while continuing the purge of said tubings. Then the heating means 4 (or different heating means) are moved around 5 in step (e) in order to desorb moisture, etc.) The purging gas can be nitrogen with the adequate low oxygen species (moisture, etc.) content during all the steps (a) to (e), except step (d), at least during the welding period, wherein the gas should be argon with the adequate low oxygen species (moisture, etc.).

FIGS. 1-B-1 and 1-B-2 represent detailed schematic enlargements of orbital TIG welding occurring during step (d) of FIG. 1-A.

FIG. 2 schematically represents the simultaneous purge and welding of tubings corresponding essentially to step (d) of FIG. 1-A. Argon (99.999% pure) from cylinder 10 flows through the valve 11, the additional purifier/moisture remover 12, the filter (particles) 13, the tubings 14 and 15, said tubings being welded together by the orbital TIG welding head 17. In this process a shielding gas (argon from the cylinder 20 through the valve 21) is provided to the welding machine 22 and the welding head 17 to shield the welding electrode during welding.

FIG. 3 represents bromine penetration in the welded tubes, under different back shield gases, at 5 mm downstream of the welding.

FIG. 4 represents the concentration of metallic elements dissolved in leaching water of welded tubes for several back shielding gases (indicated at the top of the drawing).

FIG. 5 represents the total metallic elements in the rinsing water of unwelded and welded tubes after corrosion at various dry down conditions. Welded samples use purified argon as back shielding gas.

DETAILED DESCRIPTION OF THE INVENTION

The corrosion sensitivity of welded samples has been evaluated after exposure to HBr gas. The experimental procedure is as follows. The drying down of the tubing has been performed for 10 minutes before the welding, using purified argon 10 standard liters per minute (AES Getter argon purifier) down to below 20 ppb of moisture (measured by API-MS). TIG welding was performed using six different back shielding gases.

Subsequently, drying down has been performed by heating the tubings at a temperature comprised between room temperature and 120° C. before exposure to HBr. The inlet level of moisture in the drying gas was below 1 ppb for a flow rate of 3 standard liters per minute. The level of moisture at the outlet was monitored using a hygrometer whose detection limit is below 20 ppb. Once the level of moisture at the outlet reached below 20 ppb, HBr was introduced in the tubings at a pressure of 2.5 bars. Then the tubings were heated at 80° C. After 120 hours of exposure, the HBr gas was removed and samples were characterized. The corrosion level of the sample was measured by leaching the internal surface with 50 cc of deionized water that was subsequently analyzed by ICP-AES (Inductively Coupled Plasma-Arc Emission Spectroscopy (Seiko Instruments)). In addition, the surface of the bead area was analyzed by Auger Electron Spectroscopy (AES 650 Perkin-Elmer). The leaching results show a lower metallic ion release in the water for purified argon compared to 5% hydrogen in argon, unpurified argon, 500 ppm of hydrogen in unpurified argon, 5% hydrogen in unpurified argon and 50 ppm oxygen in argon (FIG. 4). (Reproducibility of the leaching technique in the range of 5% to 20% around the mean value has been checked). The penetration depth of the bromine near the welding bead shows the same results. Samples welded with purified argon as back shield gas exhibit lower bromine penetration than all the other gases tested (FIG. 3). The baking temperature for the drying down before corrosion has been tested. The results of the rinsing experiments indicate that the tubings exhibit lower corrosion when drying down is performed at higher temperature for welded and for non welded samples (FIG. 5).

Therefore, it is preferred to dry down the tubing to reach a level lower than 20 ppb in the inert back shield gas. The welding should be performed with purified argon or with an inert gas whose oxygen partial pressure is comprised between $10^{-11} < PO_2 < 10^{-8}$ atmospheres at 1500° C. The drying down should be done with heating at temperatures over 100° C., thus decreasing the dry down time and permit a lower corrosion level after corrosive gas exposure.

Before corrosion, the surface composition of the samples was measured 5 mm downstream by Auger Electron Spectrometry depth profiling. The results show a thinner manganese deposition for purified argon used as a back shielding gas, according to the invention (about 50 Å) compared with industrial grade argon or unpurified argon (about 100 Å). (The term back shielding gas as used herein means a gas used for protection of the inside of the device to be welded, such as a tubing, during the welding process of said device).

We claim:

1. A process for avoiding or reducing corrosion in a junction area to stainless steel piping means welded together, each of said piping means being adapted to flow corrosive gases therethrough, said process comprising:
    (a) connecting a first stainless steel piping means to an inert gas source;
    (b) purging said first stainless steel piping means with an inert gas containing substantially not more than 10 ppb of an oxidizing species, said inert gas flowing from a first opening to a second opening of said first piping means;
    (c) placing a second piping means in flow communication with the first piping means, while continuing to purge the first piping means; and
    (d) sealingly welding the two piping means, said welding being carried out under an inert gas atmosphere; and
    wherein at least one of said piping means is heated during said purge of said first piping means.

2. The process of claim 1, wherein said steps c) and d) are repeated.

3. The process according to claim 1, wherein only one piping means is heated at a time.

4. The process of claim 1, wherein said at least one piping means is heated during purge thereof between 80° C. and 450° C.

5. The process of claim 4, wherein said at least one piping means is heated during purge thereof to between 100° C. and 150° C.

6. The process according to claim 1, further comprising the step of purging said second piping means with the inert gas flowing from said second opening of said first piping means for a time sufficient to obtain a moisture concentration at said second piping means output which is less than about 20 ppb.

7. The process according to claim 1, wherein the welding of step d) is carried out under argon atmosphere comprising substantially not more than 10 ppb of an oxidizing species selected from the group consisting of oxygen, carbon dioxide, water vapor and mixtures thereof.

8. The process according to claim 1, wherein the welding of step d) is carried out under a mixture of inert gas and hydrogen in a concentration such that said mixture has an oxygen partial pressure between $10^{-11}$ and $10^{-8}$ atmosphere at 1500° C.

9. The process according to claim 1, further comprising a step of detecting leaks in the welded piping, which comprises passing purified helium containing substantially not more than 10 ppb of an oxidizing species selected from the group consisting of oxygen, carbon dioxide, water vapor and mixtures thereof therethrough, and detecting any leakage.

10. The process according to claim 1, wherein a corrosive gas is introduced into a line made of welded piping means and connected to a point of use without prior exposure, between the end of the welding of the piping means and the introduction of said corrosive gas, to any gas in an amount of greater than 10 ppb, said gas being selected from the group consisting of oxygen, carbon dioxide, water vapor and mixtures thereof.

* * * * *